(12) United States Patent
Ebata

(10) Patent No.: US 7,577,436 B2
(45) Date of Patent: Aug. 18, 2009

(54) OPERATION MANAGEMENT SYSTEM OF RADIO COMMUNICATION SYSTEM AND METHOD THEREOF, AND OPERATION MANAGEMENT APPARATUS AND PROGRAM TO BE EMPLOYED FOR IT

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 10/930,871

(22) Filed: Sep. 1, 2004

(65) Prior Publication Data

US 2005/0048965 A1 Mar. 3, 2005

(30) Foreign Application Priority Data

Sep. 3, 2003 (JP) ............................. 2003-310827

(51) Int. Cl.
*H04W 40/00* (2009.01)
(52) U.S. Cl. ..................... 455/446; 455/423; 455/424; 455/453
(58) Field of Classification Search .............. 379/32.01; 455/424, 446, 453
See application file for complete search history.

(56) References Cited

U.S. PATENT DOCUMENTS

| | | | | |
|---|---|---|---|---|
| 5,023,900 A | * | 6/1991 | Tayloe et al. ............. | 379/32.01 |
| 5,463,673 A | * | 10/1995 | Herscovici .................. | 455/446 |
| 5,490,285 A | * | 2/1996 | Ahlenius et al. ............ | 455/446 |
| 5,666,356 A | | 9/1997 | Fleming et al. | |
| 5,987,055 A | * | 11/1999 | Duque-Anton et al. ...... | 375/130 |
| 5,987,328 A | * | 11/1999 | Ephremides et al. ........ | 455/446 |
| 6,173,187 B1 | | 1/2001 | Salonaho et al. | |
| 6,188,894 B1 | * | 2/2001 | Clancy ....................... | 455/423 |
| 6,192,244 B1 | * | 2/2001 | Abbadessa .................. | 455/436 |
| 6,304,754 B1 | * | 10/2001 | DeSantis et al. ............ | 455/436 |
| 6,343,290 B1 | * | 1/2002 | Cossins et al. ................ | 707/10 |

(Continued)

FOREIGN PATENT DOCUMENTS

CN 1147189 A 4/1997

(Continued)

OTHER PUBLICATIONS

Japanese Office Action dated Aug. 23, 2005 (and English translation of relevant portion).

(Continued)

*Primary Examiner*—Vincent P Harper
*Assistant Examiner*—Mazda Sabouri
(74) *Attorney, Agent, or Firm*—Dickstein Shapiro LLP

(57) ABSTRACT

An operation management system in a radio communication system, including a plurality of wireless base stations, includes: a cell determining means for determining a boundary of a cell by: collecting power transmitted, and antenna gain, from each wireless base station, computing a propagation loss from each of the wireless base stations at an arbitrary observation point, using a statistical technique employing an estimation model in which a radio wave damps depending upon distance or by use of a ray-tracing method, computing power received from each wireless base station at the observation point, deciding that the wireless base station that achieves maximum received power at the observation point is a connection base station at the observation point, and determining the space between points in which connection base stations differ as cell boundaries.

34 Claims, 18 Drawing Sheets

U.S. PATENT DOCUMENTS

| | | |
|---|---|---|
| 6,499,006 B1 | 12/2002 | Rappaport et al. |
| 6,522,888 B1 * | 2/2003 | Garceran et al. .......... 455/456.3 |
| 6,748,222 B1 | 6/2004 | Hashem et al. |
| 6,801,756 B1 * | 10/2004 | Agrawal et al. .......... 455/67.11 |
| 6,829,491 B1 * | 12/2004 | Yea et al. .................... 455/446 |
| 2002/0022487 A1 | 2/2002 | Ahn |
| 2002/0042276 A1 | 4/2002 | Hakalin et al. |
| 2002/0129138 A1 | 9/2002 | Carter |
| 2003/0002450 A1 * | 1/2003 | Jalali et al. ................. 370/294 |
| 2003/0003921 A1 | 1/2003 | Laakso |
| 2003/0040318 A1 * | 2/2003 | Fattouch .................... 455/446 |
| 2003/0083073 A1 * | 5/2003 | Cossins et al. ............. 455/446 |
| 2003/0224813 A1 * | 12/2003 | Lehtinen et al. ............ 455/513 |

FOREIGN PATENT DOCUMENTS

| | | |
|---|---|---|
| CN | 1352497 A | 6/2002 |
| EP | 0 431 956 A2 | 6/1991 |
| JP | 8-289366 | 11/1996 |
| JP | HEI 10-093616 | 4/1998 |
| JP | 2002-185458 | 6/2002 |
| JP | 2002-223218 | 8/2002 |
| JP | 2003-70050 | 3/2003 |
| JP | 2005-506721 | 3/2005 |
| WO | WO 02/073890 A2 | 9/2002 |

OTHER PUBLICATIONS

English translation of Chinese Office Action dated Jan. 6, 2006.

* cited by examiner

CELL BOUNDARY DETERMINING PROCESS BY ACTUAL MEASUREMENT

FIG. 11

| OPERATIONAL SITUATION | ACQUIRED INFORMATION | | ACQUIRED DATA EXAMPLE | WORKING/COMPUTING METHOD | NUMERICAL VALUE EXAMPLE |
|---|---|---|---|---|---|
| | AP | TERMINAL | | | |
| AVERAGE RECEIVED POWER | | POWER RECEIVED FROM CONNECTION AP (RECEIVED DESIRED-WAVE POWER) | -65 dBm | (TOTAL OF RECEIVED DESIRED-WAVE POWER OF WLAN TERMINAL WITHIN CELL) ÷ (NUMBER OF WLAN TERMINAL WITHIN CELL) | -66 dBm |
| AVERAGE SN RATIO | | POWER RECEIVED FROM CONNECTION AP (RECEIVED DESIRED-WAVE POWER) | -65 dBm | (TOTAL OF RECEIVED DESIRED-WAVE POWER OF WLAN TERMINAL WITHIN CELL) ÷ (NUMBER OF WLAN TERMINAL WITHIN CELL) ÷ (NOISE POWER) | 20 dBm |
| AVERAGE INTERFERENCE AMOUNT | | POWER RECEIVED FROM NON-CONNECTION AP (RECEIVED INTERFERENCE-WAVE POWER) | -75 dBm (NON-CONNECTION AP) -85 dBm (NON-CONNECTION AP) | TOTAL OF RECEIVED INTERFERENCE-WAVE POWER OF ONE TERMINAL=INTERFERENCE AMOUNT ↓ COMPUTING AVERAGE VALUE OF WLAN TERMINALS WITHIN CELL | -71 dBm |
| AVERAGE SI RATIO | | POWER RECEIVED FROM CONNECTION AP AND NON-CONNECTION AP (RECEIVED DESIRED-WAVE/INTERFERENCE-WAVE POWER) | -65 dBm (CONNECTION AP) -75 dBm (NON-CONNECTION AP) -75 dBm (NON-CONNECTION AP) | (RECEIVED DESIRED-WAVE POWER OF ONE TERMINAL) ÷ (TOTAL OF RECEIVED INTERFERENCE-WAVE POWER)=SI RATIO ↓ COMPUTING AVERAGE VALUE OF WLAN TERMINALS WITHIN CELL | 18 dB |

FIG. 12

| OPERATIONAL SITUATION | ACQUIRED INFORMATION | | ACQUIRED DATA EXAMPLE | WORKING/COMPUTING METHOD | NUMERICAL VALUE EXAMPLE |
|---|---|---|---|---|---|
| | AP | TERMINAL | | | |
| LOAD STATUS | TRANSMITTED DATA AMOUNT QUEUE LENGTH | TRANSMITTED DATA AMOUNT QUEUE LENGTH | 250 K OCTET (TRANSMITTED DATA AMOUNT) 3000 OCTET (QUEUE LENGTH) | (TOTAL OF TRANSMITTED DATA AMOUNT OF WLAN APPLIANCES WITHIN CELL AND QUEUE LENGTH) ÷ (INTERVAL OF INFORMATION ACQUISITION TIME) | 6.2 Mbps |
| THROUGHPUT 1 | RECEIVED DATA AMOUNT | RECEIVED DATA AMOUNT | 150 K OCTET | (TOTAL OF RECEIVED DATA AMOUNT OF WLAN APPLIANCES WITHIN CELL) ÷ (INTERVAL OF INFORMATION ACQUISITION TIME) | 34.3 Mbps |
| THROUGHPUT 2 | RECEIVED DATA AMOUNT TRANSMITTED DATA AMOUNT | | 250 K OCTED (RECEIVED DATA AMOUNT) 500 K OCTET (TRANSMITTED DATA AMOUNT) | (RECEIVED DATA AMOUNT+TRANSMITTED DATA AMOUNT) ÷ (INTERVAL OF INFORMATION ACQUISITION TIME) | 3.8 Mbps |
| USE CHANNEL | CHANNEL | | 3 CH | | 3 CH |

CHANNEL USE SITUATION

OPERATION MANAGEMENT SYSTEM OF RADIO COMMUNICATION SYSTEM AND METHOD THEREOF, AND OPERATION MANAGEMENT APPARATUS AND PROGRAM TO BE EMPLOYED FOR IT

BACKGROUND OF THE INVENTION

The present invention relates to an operation management system of a radio communication system and a method thereof, and an operation management apparatus and a program to be employed for it, and more particularly to an operation management technique in a wireless LAN (Local Area Network) including a plurality of wireless base stations.

Conventionally, as a tool for displaying setting/statistical information of the wireless LAN, there has been known a management tool of a wireless LAN access point (AP) (which is often installed as a Web server within the AP). This tool makes it possible to obtain statistical information associated with an operation such as a packet number to be transmitted/received in the AP or an error packet number, or information of a channel in use. Acquiring and analyzing this statistical numerical information allows an operational situation of the above wireless LAN to be grasped; however the analysis demands high technical abilities and experience. That is, only based upon the numerical value of the statistical information, it is not easy to determine whether the operational situation is good or bad from information acquired by an administrator.

Also, as a technology of visually displaying the operational situation, there has been known the technology disclosed in a patent document 1, in which the effect that an interference situation in the AP was graphed and displayed according to its interference ratio was described, and its display example is shown in FIG. 17. The use situation of a wireless medium in one certain AP, which is divided into three kinds of a situation where an appliance belonging to the above AP (its own group) is used, a situation where an appliance belonging to the other AP (other group) is used and a noise situation, is displayed according to respective ratios for which these situations account. The administrator, who views the display as shown in FIG. 17, thereby to be able to easily grasp that a ratio at which the appliance belonging to the above AP is used is low or a ratio of the noise is high, can recognize that the operation is a problem.

Based upon this recognition of the problem, a countermeasure of removing a noise source or the like is taken responding to a necessity.

[Patent document 1] JP-P1998-93616A

However, the technology of the patent document 1, which is capable of easily grasping whether the interference situation associated with a single AP is good or bad, is not able to go so far as to grasp a range in which the above operational situation (interference situation) exerts an influence. Also, a wireless LAN system, in which a plurality of the APs are installed and this plurality of the APs are employed, thereby to cover the area range to a some extent, is taken into consideration, in which the problem exists that the situation of the entirety of the system that is comprised of a plurality of the APs is impossible to grasp simultaneously. For example, in a case where the display as shown in FIG. 18 was generated AP by AP, it is sometimes determined that a plurality of the APs are a problem respectively. At this moment, as a method of deciding a priority order in which the countermeasure is taken, it can be considered to employ an influence range of the AP, i.e. a space of a cell that is a coverage range; however the problem exists that it is impossible to make a determination only with the display as shown in FIG. 18.

Also, in a case where a user who used a terminal made a report "performance of the LAN system deteriorated" to the administrator, the administrator has to investigate which AP the terminal of the above user makes a connection to because the display as shown in FIG. 18 is output AP by AP. However, it takes labor and time to investigate the connection destination AP of the above terminal because the user who uses the terminal is never aware of the AP to which its own terminal is connected, so it is impossible to quickly cope with claims of the user.

Also, conventionally, by acquiring the numerical value of setting/statistic information, or by making a graph display of the interference situation, the administrator specified operational situation for each AP, and specified the AP that was a connection destination of the user's terminal, thereby to estimate the performance of the terminal. However, normally, it was difficult for the operational administrator to estimate the performances of the terminal because the user used the AP that was a connection destination of the terminal without being aware thereof.

SUMMARY OF THE INVENTION

An objective of the present invention is to provide an operation management system of a radio communication system capable of, in a case of operating the wireless LAN system that covers a wide-range area by employing a plurality of the APs, visually displaying the operational situation based upon a load situation or an interference situation in each cell, a utilization situation of the wireless channel, etc. together with its influence range on an area map and a method thereof, and an operation management apparatus and a program to be employed for it.

The operation management system in accordance with the present invention, which is an operation management system in a radio communication system including a plurality of wireless base stations, is characterized in comprising a cell determining means for determining a cell that is a coverage range of each of said plurality of said wireless base stations, and an operational situation acquiring means for obtaining an operational situation said cell by said cell, based upon operational information in each said cell.

The operation management method in accordance with the present invention, which is an operation management method in a radio communication system including a plurality of wireless base stations, is characterized in comprising a cell determining step of determining a cell that is a coverage range of each of said plurality of said wireless base stations, and an operational situation acquiring step of obtaining an operational situation said cell by said cell, based upon operational information in each said cell.

The operation management apparatus in accordance with the present invention, which is an operation management apparatus in a radio communication system including a plurality of wireless base stations, is characterized in comprising an operational situation acquiring means for obtaining an operational situation said cell by said cell, based upon operational information in a cell that is a coverage range of each of said plurality of said wireless base stations.

The program in accordance with the present invention, which is a program for causing a computer to execute an operation of an operation management apparatus in a radio communication system including a plurality of wireless base stations, is characterized in comprising a process of obtaining an operational situation said cell by said cell, based upon operational information in a cell that is a coverage range of each of said plurality of said wireless base stations.

In accordance with the present invention, in the wireless LAN system for operating a plurality of the wireless base stations (Access Point: AP), each operational situation based upon a cell range of each AP and operational information of the wireless appliance in the above cell is grasped, and each cell range on the area map is caused to have a display aspect that coincided with the operational situation. Doing so allows the administrator to easily grasp the operational situation location by location, and to determine communication quality for each location, whereby the effect exists that it becomes easy to find factors of deterioration in performance.

BRIEF DESCRIPTION OF THE DRAWINGS

This and other objects, features and advantages of the present invention will become more apparent upon a reading of the following detailed description and drawings, in which:

FIG. 11 is a view illustrating a correspondence relation between the operational situation, and collected information necessary for it and its working/computing method;

FIG. 12 is a view illustrating a correspondence relation between the operational situation, and collected information necessary for it and its working/computing method;

DETAILED DESCRIPTION OF THE INVENTION

Figure 1:
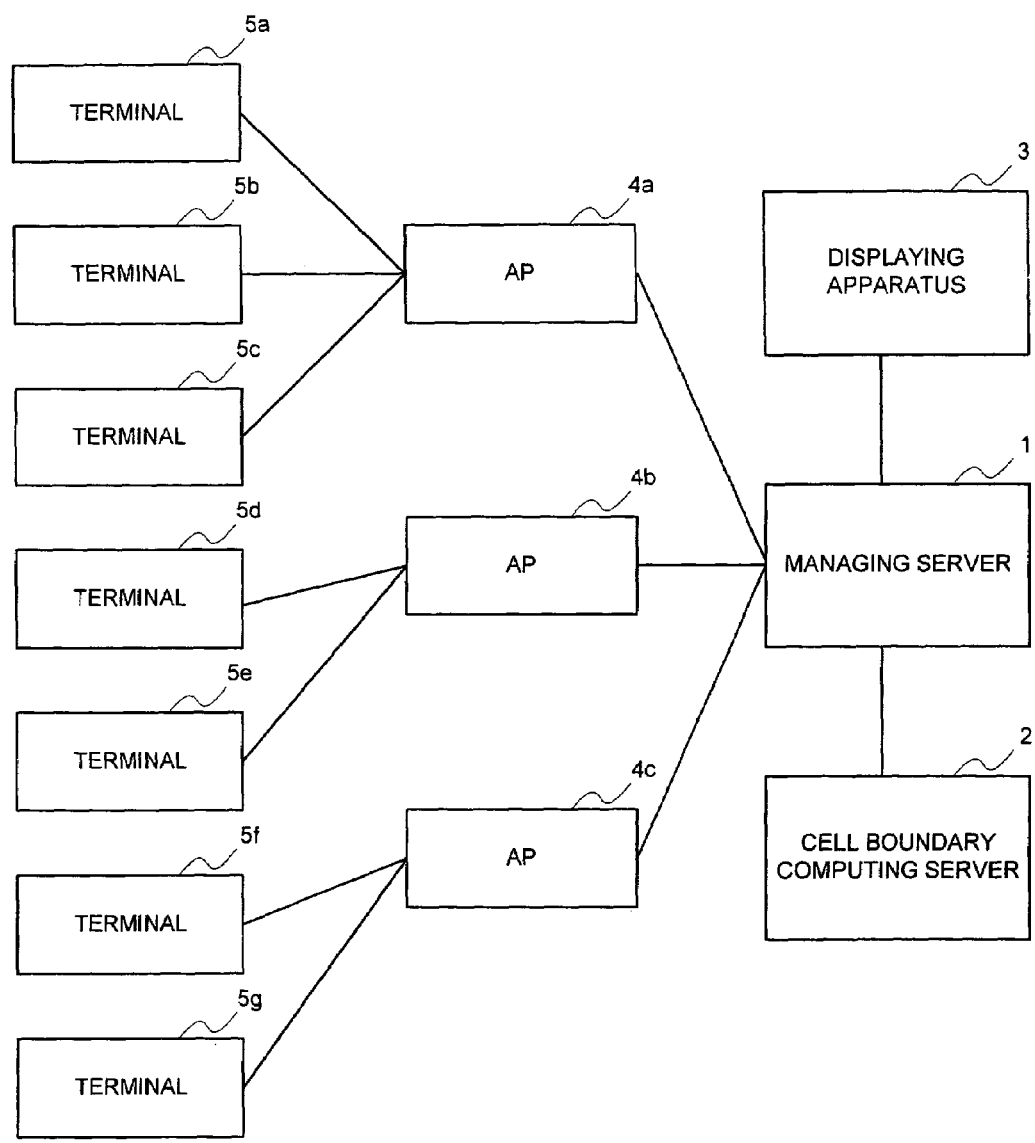
FIG. 1 is a system block diagram of one embodiment of the present invention.

Hereinafter, an embodiment of the present invention will be explain in details while making a reference to the accompanied drawings. FIG. 1 is a view illustrating the entirety of the system that is an embodiment of the present invention. A reference to FIG. 1 is made, in which the embodiment of the present invention is configured of a managing server 1, a cell boundary computing server 2, a displaying apparatus 3, access points (APs) 4a to 4c that are a plurality of wireless base stations, and a plurality of W (wireless) LAN terminals 5a to 5g.

The managing server 1 has functions of acquiring and retaining various kinds of operational information to be described later from the WLAN appliances (which are assumed to include the AP and the terminal), of causing the displaying apparatus 3 to display the operational situation with a predetermined method, and of retaining information of a cell boundary (a boundary of the range that the AP covers) that the cell boundary computing server 2 was caused to compute by providing necessary information hereto.

The displaying apparatus 3, which is installed in an identical apparatus to the managing server 1, or a remote location via a network, has a function of displaying the operational situation in a display aspect for which an instruction was given from the managing server 1. The cell boundary computing server 2, to which various kinds of the operational information of the WLAN appliances under operation are provided from the managing server 1, has a function of computing a range that each AP covers. The AP 4a to 4c and the WLAN terminals 5a to 5g, which are a general WLAN appliance respectively, have a function of providing various kinds of the operational information to the managing server. However, there is a case where only one of the AP and the terminal has a function of providing the operational information and the other has not the above function, depending upon the operational situation to be displayed on the displaying apparatus 3.

Figure 2:
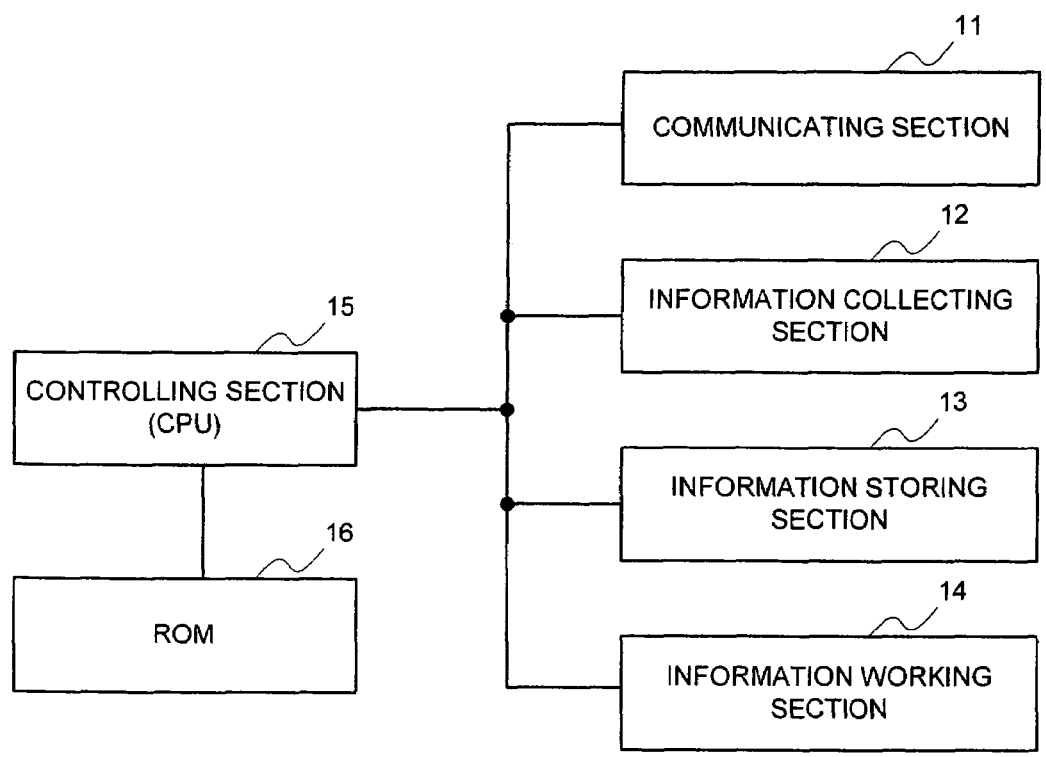
FIG. 2 is a functional block diagram of a managing server 1 of FIG. 1.

FIG. 2 is a functional block diagram of the managing server 1. In FIG. 2, a communicating section 11 is for making communication with the cell boundary computing server 2, the displaying apparatus 3 and the APs 4a to 4c, and an information collecting section 12 is for collecting various kinds of operational information from the APs 4a to 4c and the terminals 5a to 5g. An information storing section 13 is a memory for storing information collected by the information collecting section 12, storing information worked by an information working section 14, and further, storing cell boundary information from the cell boundary computing server 2. A controlling section 15, which is a CPU for controlling each of these sections 11 to 14, executes a controlling operation with a program pre-stored in a ROM 16.

Figure 3:
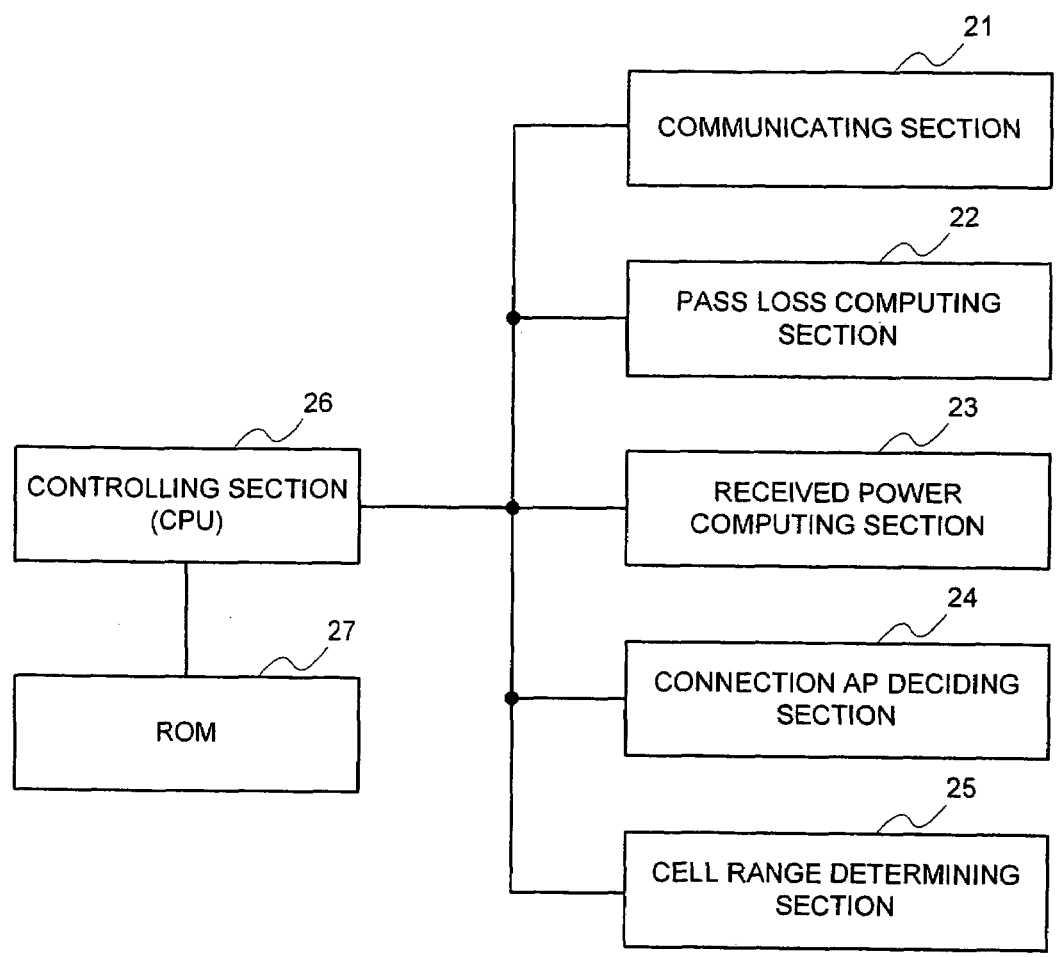
FIG. 3 is a functional block diagram of a cell boundary computing server 2 of FIG. 1.

FIG. 3, which is a block diagram of the cell boundary computing server 2, exemplifies the block in a case of making a simulation of computation of the cell boundary. As shown in FIG. 3, the cell boundary computing server 2 has a communication section 21 for making communication with the managing server 1, a pass loss computing section 22, a received power computing section 23, a connection AP deciding section 24, a cell range determining section 25, a controlling section (CPU) 26 for controlling each of these sections, and a ROM 27 having an operational procedure of this controlling section 26 pre-stored as a program. Each of the sections 22 to 25 has a function of computing the cell boundary of each AP, and its details will be explained together with an operational flow to be described later.

Figure 4:
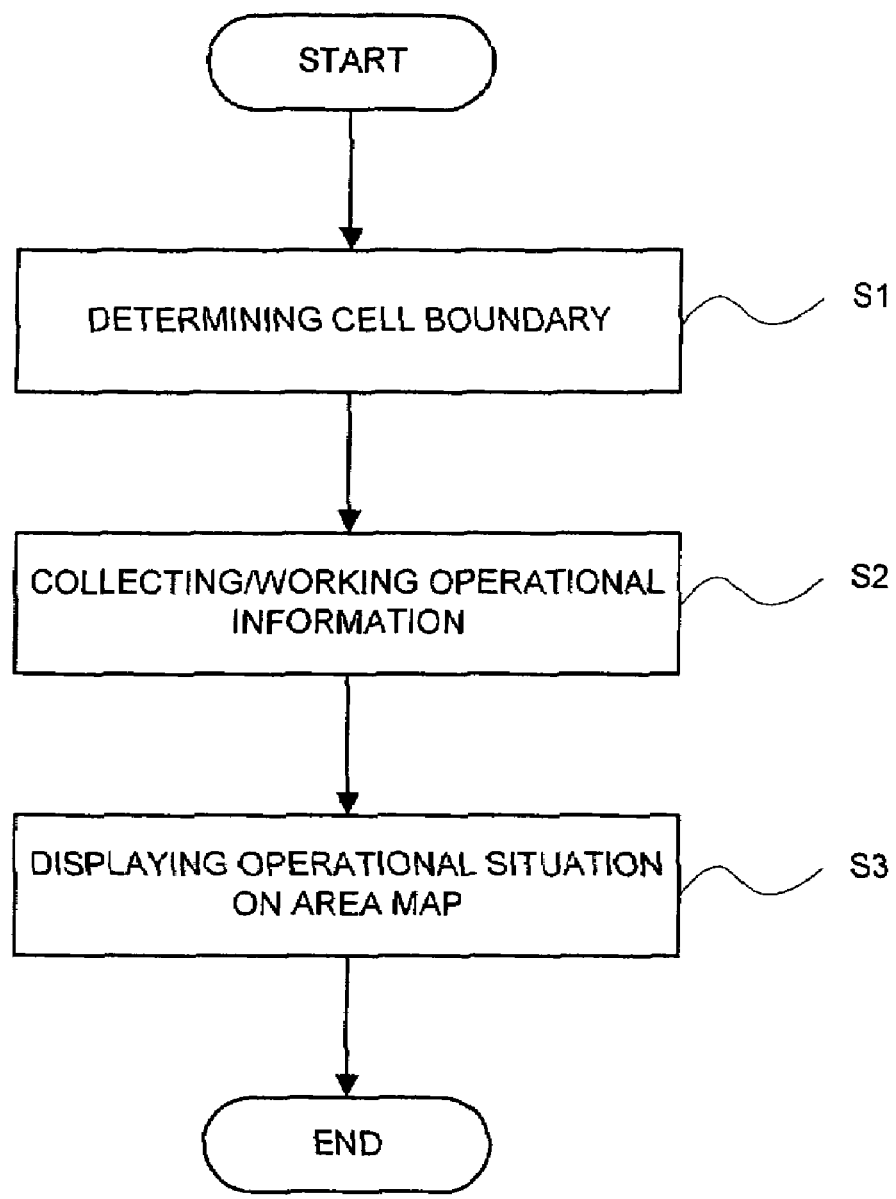
FIG. 4 is a process flowchart of the entirety of the invention.

FIG. 4 is a flowchart illustrating an operation of the entirety of the embodiment of the present invention, which is divided broadly into three processes. That is, it has a cell boundary determining step S1 of clarifying the cell boundaries of a plurality of the APs, an operational information collecting/working step S2 of collecting various kinds of operational information from each WLAN appliance to work this collected information responding to a necessity and for finding the operational situation, and an operational situation displaying step S3 of partitioning a service area of the wireless LAN system for each coverage range (cell) of each AP to make a display and of deciding the display aspect within the coverage range of each AP responding to the operational situation found in the step S2 to display the operational situation on the area map having it reflected. Additionally, the step S1 is basically an operation of the cell boundary computing server 2, the step S2 is an operation of the managing server 1, and the step S3 is an operation of the displaying apparatus 3.

Figure 5:
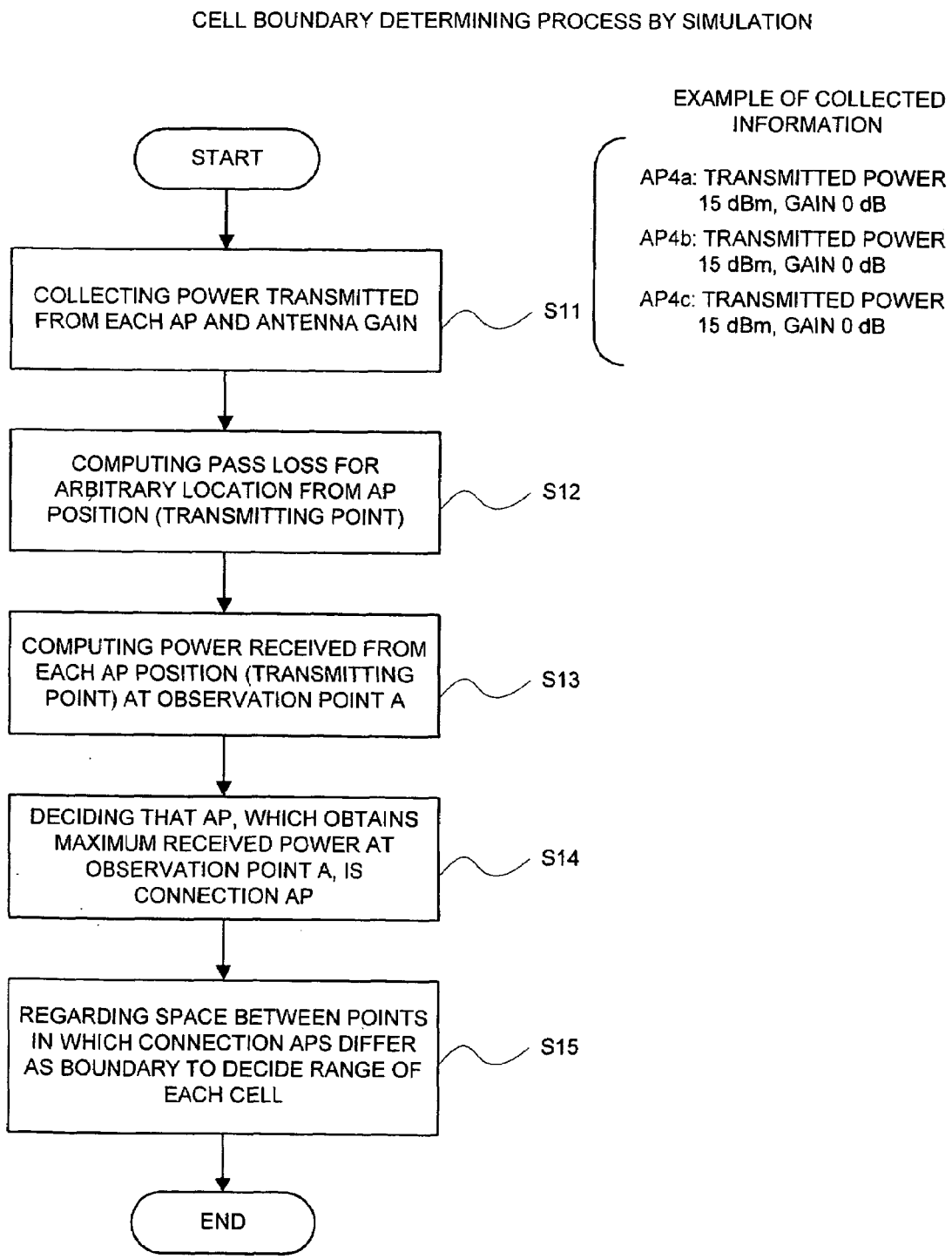
FIG. 5 is a flowchart of a cell boundary determining process by a simulation.

FIG. 5 is a flowchart illustrating the details of the operation of the cell boundary determining step S1 of FIG. 4, and as a processing method for this cell boundary determining step, a method by a simulation and a method by actual measurement are listed; however at first the method by the simulation will be explained according to a flow of FIG. 5. The functional block of the cell boundary computing server 2 in this case is one shown in FIG. 3.

In a case of employing the simulation, thereby to find the cell boundary, the managing server 1 collects power transmitted from each of the APs 4a to 4c and an antenna gain by the information collecting section 12, and transmits them to the cell boundary computing server 2 (step S11). One example of the collected information in this case is shown in a right and upper part of FIG. 5. Additionally, if these values are to be used in a fixed manner, they may be pre-set within the cell boundary computing server 2.

Figure 6:
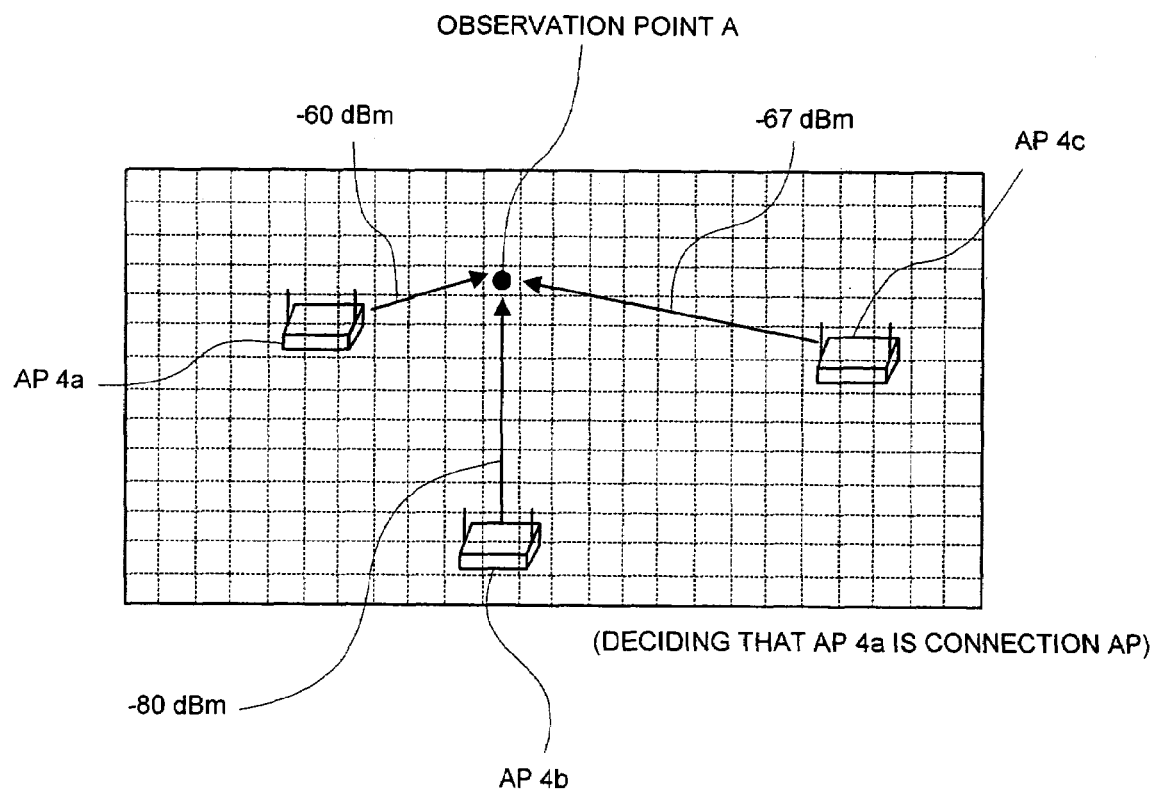
FIG. 6 is a view for explaining a cell boundary determining method employing a radio-wave propagation simulation.

As a technique of finding an arrival range of a radio wave that the AP transmits, the cell boundary computing server 2 employs a statistical technique of employing an estimation model in which the radio wave damps depending upon a distance, or a technique of taking into consideration an influence of a structure like a ray-tracing method. By employing these techniques, for example, as shown in FIG. 6, a pass loss (propagation loss) from each of the APs 4a to 4c at an arbitrary observation point A (one of a plurality of minute areas to be obtained by partitioning the above service area in a lattice shape) within the service area (which is shown in a rectangular shape in the figure) of the WLAN that is an object of operation is estimated in the pass loss computing section 22 (step S12), and by employing the transmitted power and the antenna gain obtained in the step S11, power received from each AP position (transmitting point) at the observation point A is computed by the received power computing section 23 (step S13).

And, the connection AP deciding section 24 decides that the AP that obtains maximum received power at the observation point A is a connection AP at this observation point A (step S14). In FIG. 6, the connection AP at the observation point A is the AP 4a. Herein, the connection AP is explained, in which each terminal carries out an association (connection process) for one AP because it makes communication in the wireless LAN, the AP for which the terminal carried out the association is called a connection AP, and at the moment that the terminal makes communication, it does so via this connection AP.

Figure 7:
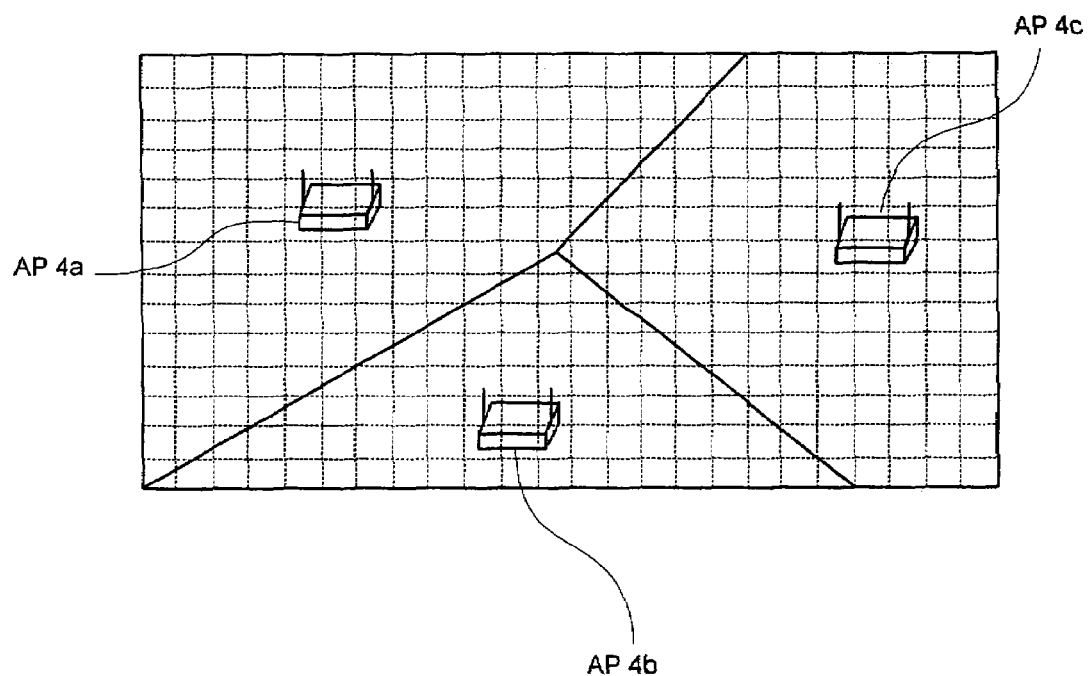
FIG. 7 is a view illustrating cell boundaries obtained by the cell boundary determining method of FIG. 6.

Deciding the connection APs at all observation points within the service area of the WLAN in such a manner allows the cell boundaries to be clarified as shown in FIG. 7, whereby the coverage range of each AP is partitioned by the cell boundary (step S15). The process of this step S15 is an operation of the cell range determining section 25 of FIG. 3.

Next, the method of clarifying the cell boundary by the actual measurement will be explained while making a reference to the flow of FIG. 8. The method by the actual measurement in this case utilizes a positioning function of the terminal. As an example of this positioning function, there are a method of finding the position from the power received from a plurality of the APs, a method of employing a system other than the WLAN, e.g. a GPS (Global Positioning System), etc. Or, a method that a measurer confirms a position on a map to inputs it is also acceptable.

Figure 8:
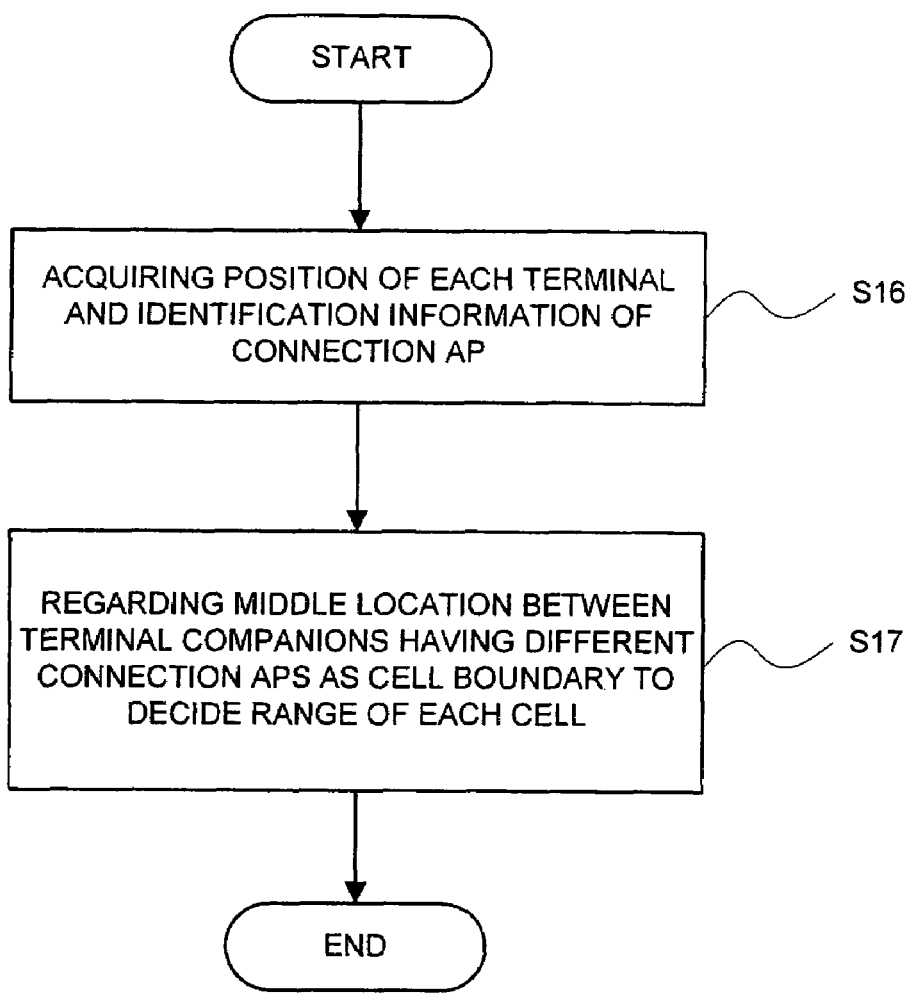
FIG. 8 is a flowchart of a cell boundary determining process by actual measurement.
Figure 9:
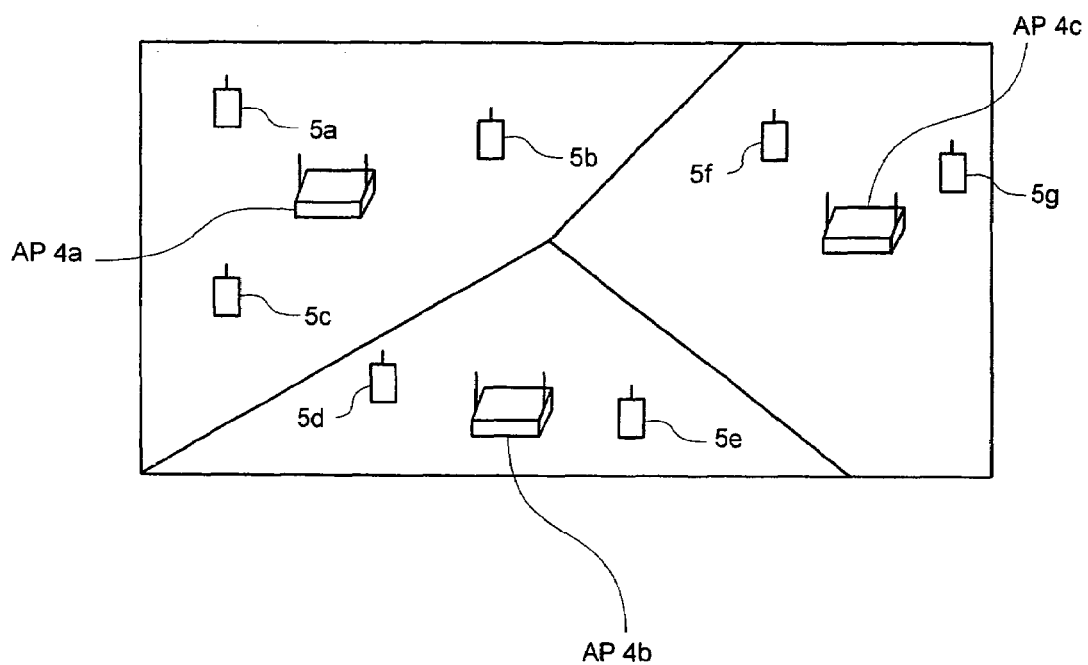
FIG. 9 is a view for explaining one example of the cell boundary determining process by the actual measurement.

A reference to FIG. 8 is made, in which at first, the managing server 1 acquires from each of the terminals 5a to 5g its position information and identification information of the connection AP (information for specifying the above AP) (step S16), and provides them to the cell boundary computing server 2. The identification information of the connection AP at each position may be provided to the cell boundary computing server 2 via the network, and the collected information may be directly input into the cell boundary computing server 2. The cell boundary computing server 2 sums up the provided information and decides the cell boundary within the service area of the wireless LAN (step S17). With regard to this decision of the cell boundary, as shown in FIG. 9, collecting the identification information of the connection APs at a number of the observation points makes it possible to detect a spot (which becomes a cell boundary) in which the connection AP is changed.

In a case where it is difficult to decide a clear cell boundary because the measured information is little, with regard to the observation points in which the observation was not made yet, a computation is made, on the premise that a connection is made to an AP identical to the AP terminal at the nearest observation point out of the observation points at which the measurement was already made. Also, the technique of the simulation and the technique of the actual measurement described above can be combined to modifying the cell boundary decided by the technique of the simulation to the actual measurement result. For example, at first the cell boundary is temporarily decided with the foregoing simulation, and in a case where a discrepancy with data by the actual measurement (information of the terminal position and the connection AP) exists, the part that differs is modified into the cell boundary to be decided by the actual measurement, thereby, making it also possible to decide the final cell boundary. Doing so allows an accuracy of the cell boundary to be enhanced.

Figure 10:
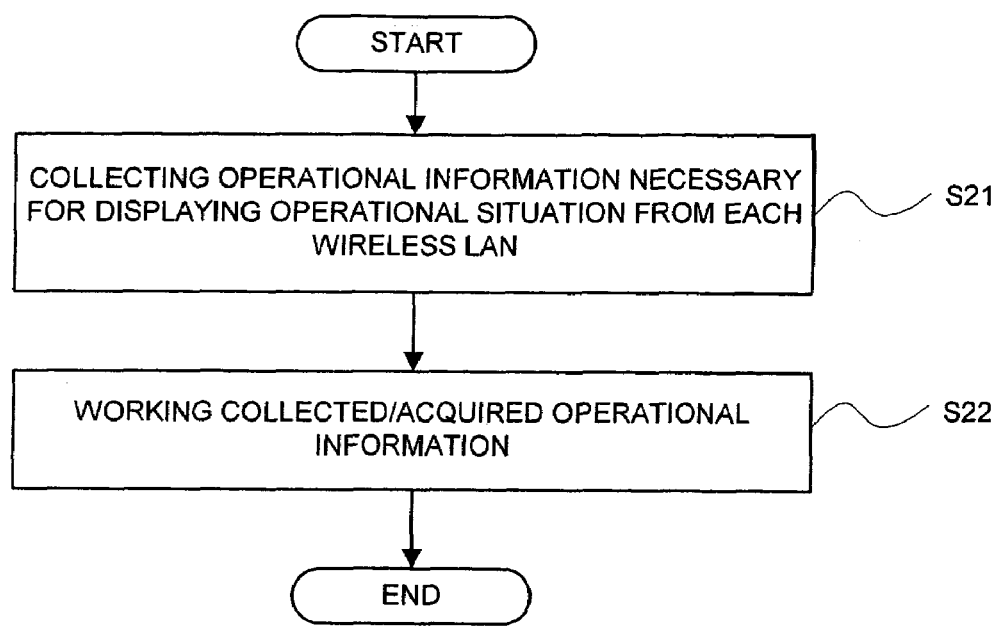
FIG. 10 is an operational flowchart of an operational information collecting/working process of the managing server 1.

Next, the managing server 1 is for collecting/working the operational information from the wireless LAN appliance at each cell that is a coverage range of each AP found by the cell boundary computing server 2 (the step S2 of FIG. 4), and for numerically finding the operational situation cell by cell, and the details of the process in this case are shown in a flow of FIG. 10. That is, the operational information necessary for displaying the operational situation is collected from each wireless LAN appliance (step S21), and this collected operational information is worked responding to a necessity by employing a predetermined equation (step S22), thereby to display the operation status for each cell as a numerical value.

FIG. 11 and FIG. 12 illustrate a correspondence relation between a class of the operational situation that should be displayed on the displaying apparatus 3, and the operational information (acquired information) necessary for it, a correspondence relation with a source (the AP or the terminal) for acquiring the above information, and further a correspondence relation with a working/computing method of the operational information. An average received power is exemplified as the operational situation, in which the acquired information in this case is received power (desired-wave power) of the connection AP in each terminal, its working/computing method is given as (a total of received desired-wave power of the WLAN terminal within the cell)÷(the number of the WLAN terminal within the cell), and this computation result becomes a value of the average power received in the cell.

Figure 13:
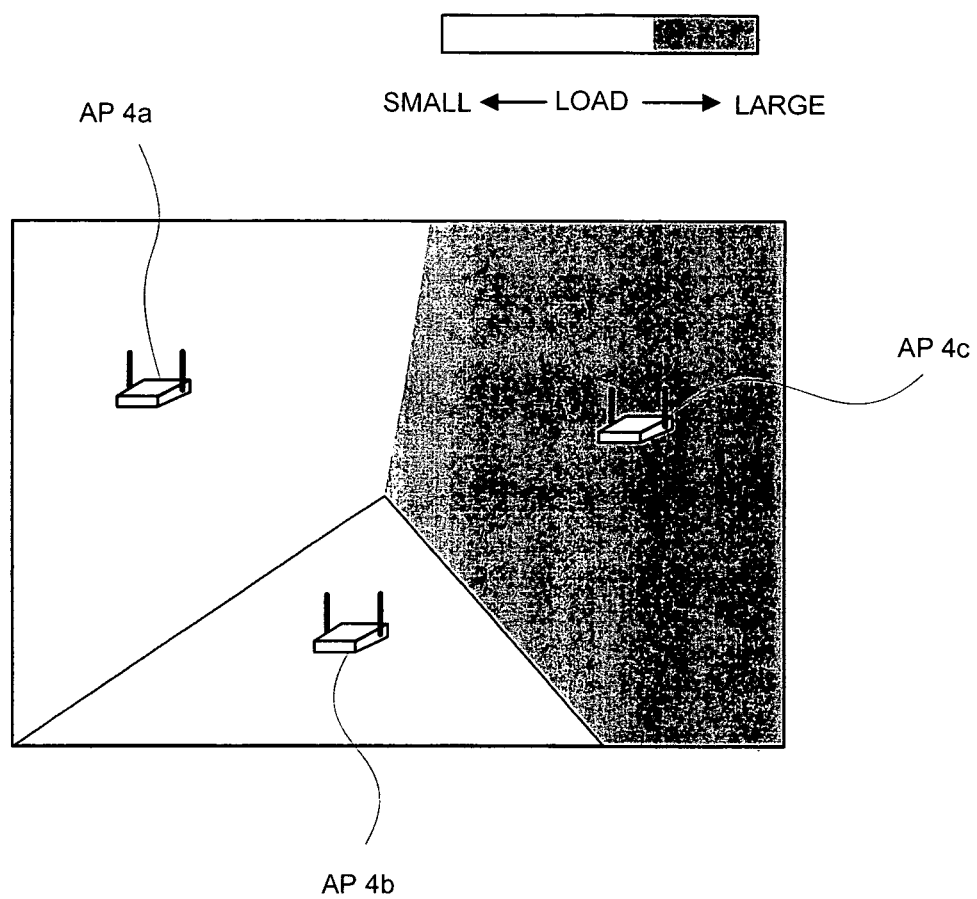
FIG. 13 is a view illustrating an outline of the display in a displaying apparatus 3.

The operational situation such as the average received power value for each cell obtained in such a manner, which is delivered to the displaying apparatus 3, is displayed on a service area map of the wireless LAN (the step S3 of FIG. 4). That is, different colors or different patterns are allocated for displaying to each area (cell that is a coverage range of each AP) partitioned by the cell boundary clarified by the cell boundary determining process in the foregoing step S1 responding to the numerical value of the operational situation of the wireless LAN appliance that is positioned in each area, as shown in FIG. 13.

In a case where the operational situation is in a load status (see FIG. 12), making a gradation display such that the operational situation is displayed in white when the value of the load is small, and is displayed in gray to black as the value is increased enables the display of the operational situation associated with the detailed loads.

An average SN ratio (second one of FIG. 11) is taken into consideration as an example of the operational situation, in which collecting power (received desired-wave power) received from the connection AP from each terminal to calculate (a total of received desired-wave power of the WLAN terminal within the cell)÷(the number of the WLAN terminal within the cell)÷(noise power) allows the average SN ratio to be obtained. The displaying apparatus makes a gradation display, a color display, or a pattern display responding to this average SN ratio cell by cell.

As the operational situation, an average interference amount, an average SI ratio, a load status, a throughput, a wireless channel usage, etc. are listed in addition hereto, as shown in FIG. 11 and FIG. 12. The acquired information and the working/computing method for displaying each of these operational situations are ones shown in FIG. 11 and FIG. 12.

Figure 14:
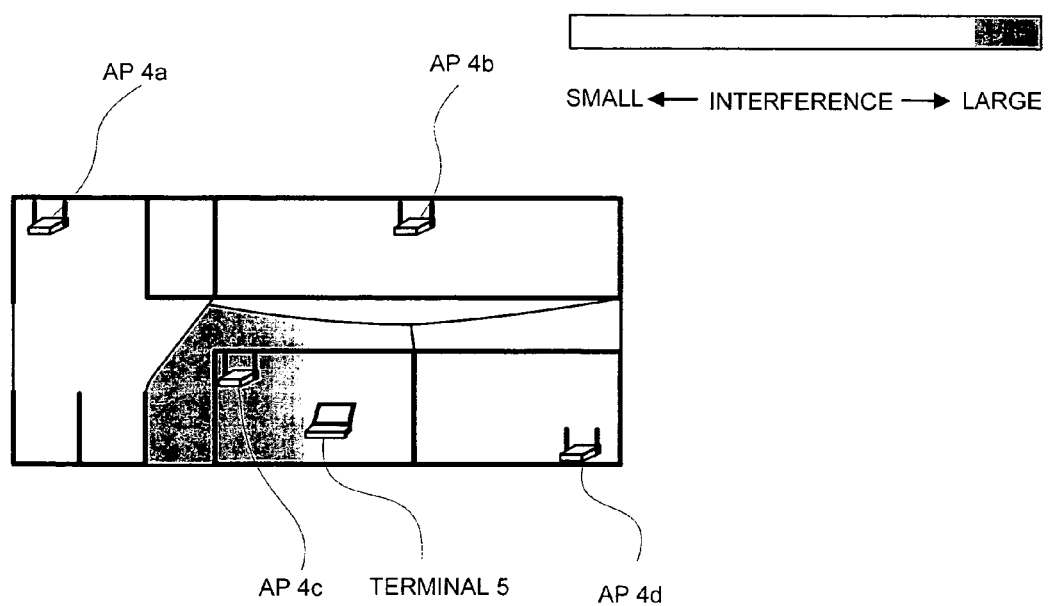
FIG. 14 is a view illustrating a specific example of the display in the displaying apparatus 3.

FIG. 14 is a view in which the interference situation is displayed in the actual WLAN service area map so as to be able to grasp it, and a display was made on a floor layout of some building. In this example, light and shade of the color allows the interference situation to be grasped, so it can be estimated that the interference is much in the cell of the AP 4c and deterioration in performance occurred because the coverage range (cell) of the AP 4c was displayed in deep color. Also, for example, in a case where the user of the terminal within the cell of the AP 4c made a report of the deterioration in performance, after the position of the user was confirmed, collating its report with this display makes it possible to immediately determine that the deterioration in performance of the above terminal is due to interference because the deterioration due to interference is much in the cell in which its terminal exists.

In the conventional technique of the patent document 1, at first, the user of the above terminal is requested to confirm which AP is a connection AP, or the administrator himself/herself goes to the location in which the user is positioned, and confirms the connection AP. Thereupon, he/she confirms the interference situation of the connection AP, and determines that the deterioration in performance of the above terminal is due to an influence of the interference.

In such a manner, in the conventional technique, it takes labor and time to find the cause of the deterioration in performance; however in the present invention, as mentioned above, determining it momentarily is enabled. Also, as shown in FIG. 14, specifying the position for removing the interference source also becomes easy because an influence of the interference can be confirmed on the WLAN service area map. In such a manner, the present invention makes the process of the operation management such as a solution of obstacles quick and yet easy as compared with the conventional technique.

Additionally, in a case where the managing server 1 collects various kinds of operational information from each WLAN appliance, a management protocol such as a SNMP (Simple Network Management Protocol) is employed.

Figure 15:
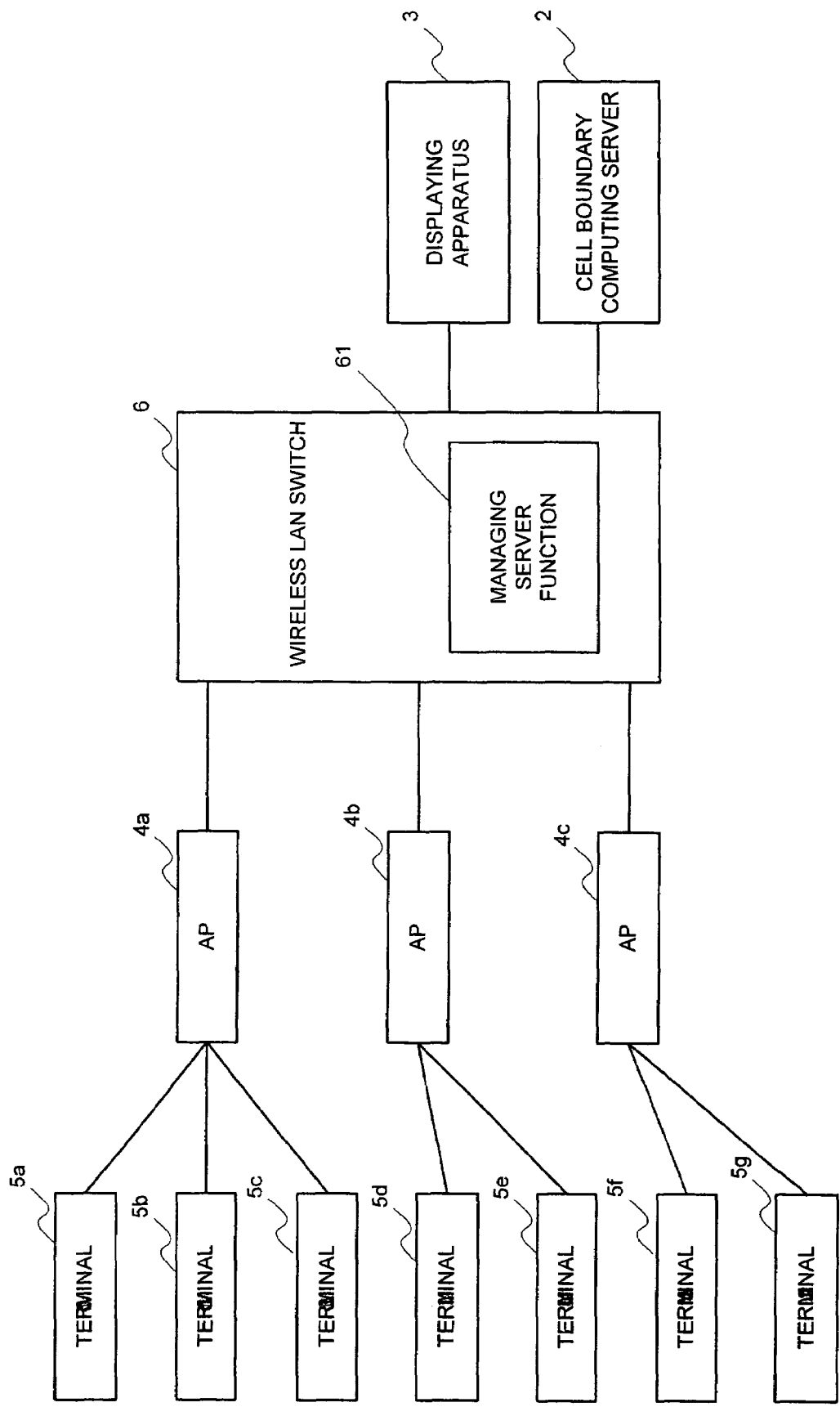
FIG. 15 is a system block diagram of another embodiment of the present invention.

FIG. 15 is a system block diagram illustrating another embodiment of the present invention, and identical codes are affixed to the part identical to FIG. 1. In a case of employing a WLAN switch 6 that specialized in the WLAN, this switch is one caused to have a function 61 of the managing server 1 shown in FIG. 1 because this WLAN switch 6 has a management function of the AP. Doing so eliminates a necessity for making the managing server another hardware component, thus enabling the scale of the hardware to be reduced.

Figure 16:
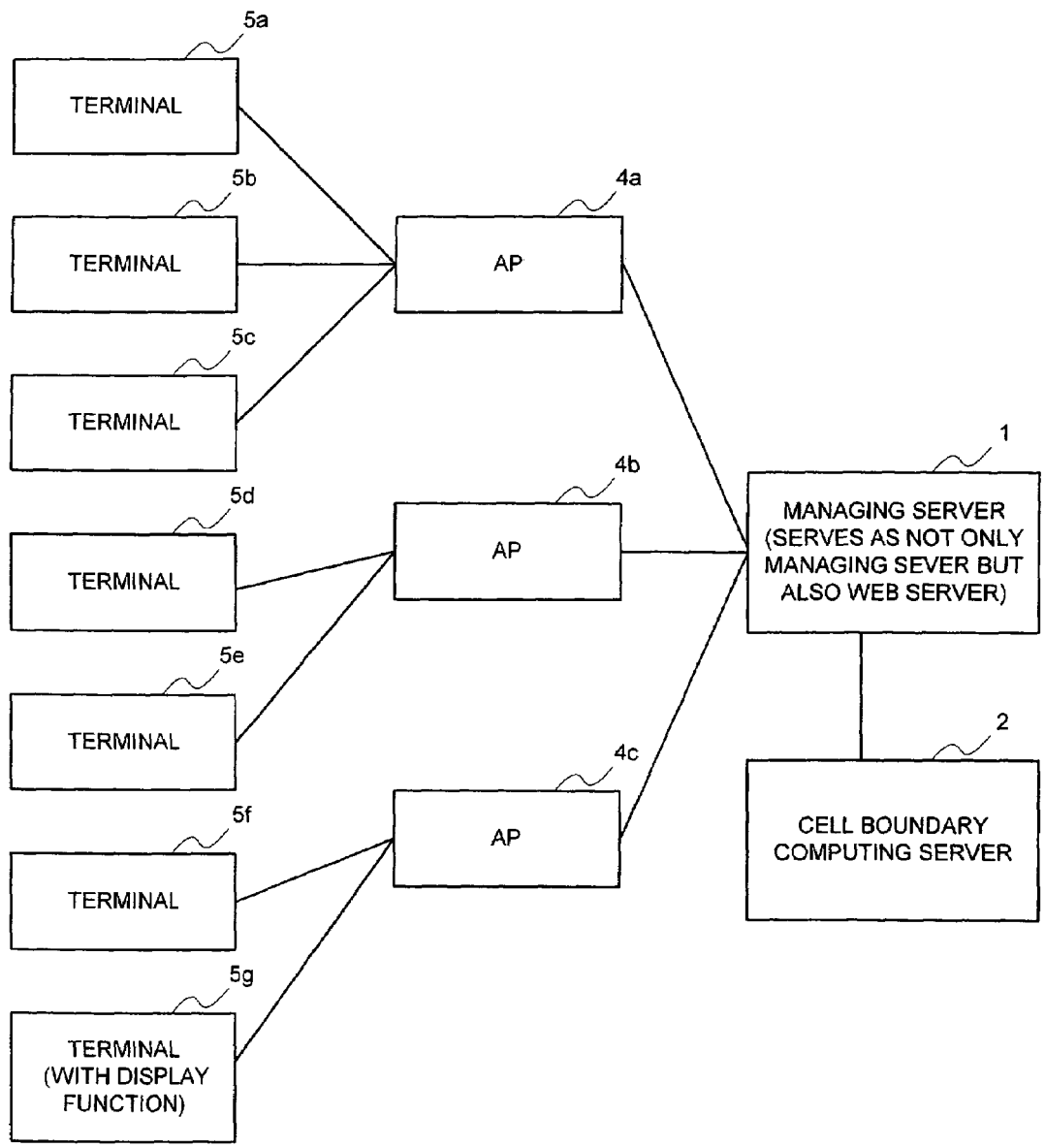
FIG. 16 is a system block diagram of yet another embodiment of the present invention.

FIG. 16 is a system block diagram illustrating yet another embodiment of the present invention, and identical codes are affixed to the part identical to FIG. 1. In this embodiment, a certain terminal (terminal 5g) out of the terminals 5a to 5g has the display function of the displaying apparatus 3 shown in FIG. 1 provided, and in a case of a configuration in which the managing server 1 serves as not only a managing server but also a WEB server, adding a WEB browser to this terminal 5g enables the displays of FIG. 13 and FIG. 14.

In a case where the user of this terminal 5g sensed deterioration in characteristics, for example, perusing the display of the interference situation with this display function enables the user to find the cell of which the interference situation is more excellent than that of the cell to which the user belongs to move to its cell, and the user himself/herself to improve the deterioration in characteristics.

Figure 17:
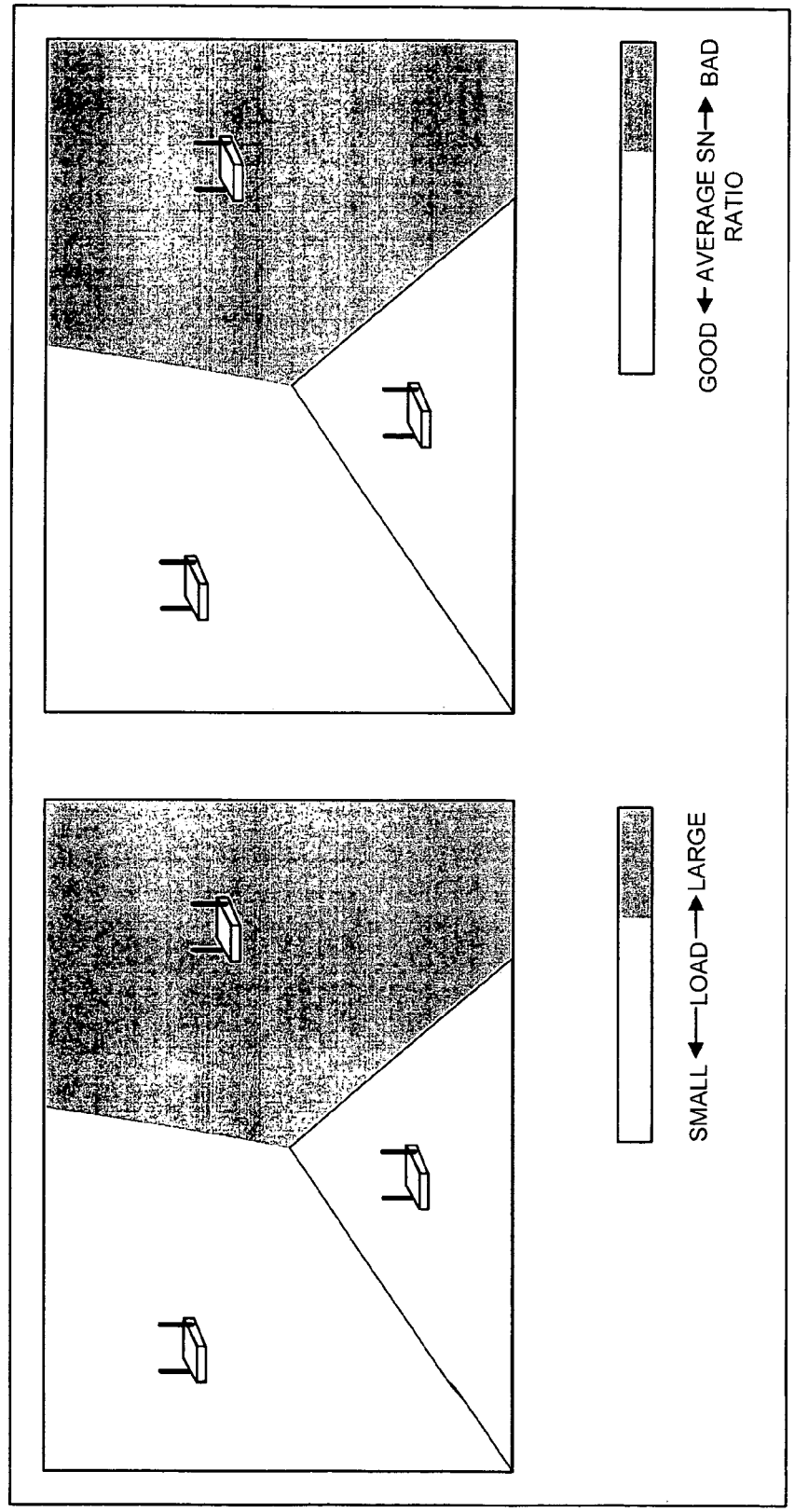
FIG. 17 is a view illustrating an example in a case of simultaneously displaying a plurality of classes of operational situations for each cell on one screen.
Figure 18:
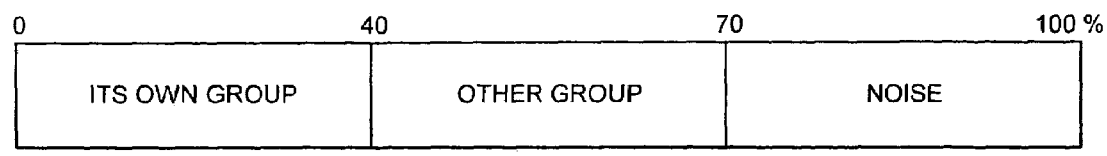
FIG. 18 is a display example of an interference situation that is one example of the operational situation in the conventional wireless LAN management.

In the embodiment and another embodiment explained above, with the display of the screen, a plurality of classes of the operational situations for each cell may be displayed, by changing one screen. Also, a plurality of classes of the operational situations for each cell may be simultaneously displayed on one screen. An example of a case of the latter is shown in FIG. 17. Herein, the status of the load for each cell and the status of the average SN ratio were displayed on one screen. With a case of the latter, it becomes possible to simultaneously check a plurality of deterioration factors in performance, thereby, for example, enabling the deterioration factors in performance to be quickly investigated for the claims etc. from the user. Further, as another example, the different numerical values of the operational situations may be displayed, based upon a value obtained by synthesizing them (for example, weighted addition of them respectively)

Needless to say, a configuration can be configured so that with each process flow in the above-mentioned embodiments, a process procedure thereof is pre-recorded in a record medium such as a ROM as a program to cause a computer (CPU) to read and execute it.

The entire disclosure of Japanese Patent Application No. 2003-310827 filed on Sep. 3, 2003 including specification, claims, drawing and summary are incorporated herein by reference in its entirety.

What is claimed is:

1. An operation management system in a radio communication system including a plurality of wireless base stations, said operation management system having:
   a cell determining means for determining a boundary of a cell corresponding to one of said plurality of wireless base stations, said cell being smaller or equal to a coverage range of said one of said plurality of said wireless base stations, the boundary of a cell being determined by the cell determining means:

collecting power transmitted, and antenna gain, from each wireless base station, computing a propagation loss from each of the wireless base stations at an arbitrary observation point, using a statistical technique employing an estimation model in which a radio wave damps depending upon distance or by use of a ray-tracing method, computing power received from each wireless base station at the observation point, deciding that the wireless base station that achieves maximum received power at the observation point is a connection base station at the observation point, and determining the space between points in which connection base stations differ as cell boundaries;

an operational situation acquiring means for acquiring an operational situation of said cell by said cell, based upon operational information in each said cell; and a displaying means for displaying cells in a service area of said radio communication system by displaying said cell boundaries determined by said cell determining means, and for displaying in each of said cells a uniform indication of the operational situation obtained by said operational situation acquiring means.

2. The operation management system according to claim 1, wherein said operational situation is average received power of a wireless appliance belonging to each said cell.

3. The operation management system according to claim 1, wherein said operational situation is an average SN (signal-to-noise) ratio of a wireless appliance belonging to each said cell.

4. The operation management system according to claim 1, wherein said operational situation is an average interference amount of a wireless appliance belonging to each said cell.

5. The operation management system according to claim 1, wherein said operational situation is an average SI (signal (desired wave)-to-interference wave) ratio of a wireless appliance belonging to each said cell.

6. The operation management system according to claim 1, wherein said operational situation is a load status of a wireless appliance belonging to each said cell.

7. The operation management system according to claim 1, wherein said operational situation is a throughput of a wireless appliance belonging to each said cell.

8. The operation management system according to claim 1, wherein said operational situation is a wireless channel usage of a wireless appliance belonging to each said cell.

9. The operation management system according to claim 1, wherein said operational situation is at least two of average received power, an average SN (signal-to-noise) ratio, an average interference amount, an average SI (signal (desired wave)-to-interference wave) ratio, a load status, a throughput, and a wireless channel usage of a wireless appliance belonging to each said cell.

10. The operation management system according to claim 1, wherein said radio communication system is a wireless LAN system including a switching means having a wireless LAN switching function connected to said plurality of said wireless base stations, and wherein said switching means has a function of said operational situation acquiring means provided.

11. The operation management system according to claim 1, wherein a wireless terminal to be connected to anyone of said wireless base stations has a function of said displaying means provided.

12. An operation management method in a radio communication system including a plurality of wireless base stations, said operation management method having:

determining a boundary of a cell corresponding to one of said plurality of wireless base stations, said cell being smaller or equal to a coverage range of said one of said plurality of said wireless base stations, the boundary of a cell being determined by the cell determining step:

collecting power transmitted, and antenna gain, from each wireless base station, computing a propagation loss from each of the wireless base stations at an arbitrary observation point, using a statistical technique employing an estimation model in which a radio wave damps depending upon distance or by use of a ray-tracing method, computing power received from each wireless base station at the observation point, deciding that the wireless base station that achieves maximum received power at the observation point is a connection base station at the observation point, and determining the space between points in which connection base stations differ as cell boundaries;

acquiring an operational situation of said cell by said cell, based upon operational information in each said cell; and displaying cells in a service area of said radio communication system by displaying said cell boundaries determined by said cell determining step, and for displaying in each of said cells a uniform indication of the operational situation obtained by said operational situation acquiring step.

13. The operation management method according to claim 12, wherein said operational situation is average received power of a wireless appliance belonging to each said cell.

14. The operation management method according to claim 12, wherein said operational situation is an average SN (signal-to-noise) ratio of a wireless appliance belonging to each said cell.

15. The operation management method according to claim 12, wherein said operational situation is an average interference amount of a wireless appliance belonging to each said cell.

16. The operation management method according to claim 12, wherein said operational situation is an average Si (signal (desired wave)-to-interference wave) ratio of a wireless appliance belonging to each said cell.

17. The operation management method according to claim 12, wherein said operational situation is a load status of a wireless appliance belonging to each said cell.

18. The operation management method according to claim 12, wherein said operational situation is a throughput of a wireless appliance belonging to each said cell.

19. The operation management method according to claim 12, wherein said operational situation is a wireless channel usage of a wireless appliance belonging to each said cell.

20. The operation management method according to claim 12, wherein said operational situation is at least two of average received power, an average SN (signal-to-noise) ratio, an average interference amount, an average SI (signal (desired wave)-to-interference wave) ratio, a load status, a throughput, and a wireless channel usage of a wireless appliance belonging to each said cell.

21. An operation management apparatus in a radio communication system including a plurality of wireless base stations, each having a cell corresponding thereto, said operation management apparatus having:

an operational situation acquiring means for obtaining an operational situation of the cell corresponding to each of said plurality of said wireless base stations, each said cell being defined by a boundary being smaller or equal to a coverage range of its respective wireless base station, the boundary of a cell being determined by:

collecting power transmitted, and antenna gain, from each wireless base station, computing a propagation loss from each of the wireless base stations at an arbitrary observation point, using a statistical technique employing an estimation model in which a radio wave damps depending upon distance or by use of a ray-tracing method, computing power received from each wireless base station at the observation point, deciding that the wireless base station that achieves maximum received power at the observation point is a connection base station at the observation point, and determining the space between points in which connection base stations differ as cell boundaries; and displaying means for displaying cells in a service area of said radio communication system by displaying said cell boundaries, and for displaying in each of said cells a uniform indication of the operational situation obtained by said operational situation acquiring means.

22. The operation management apparatus according to claim 21, wherein said operational situation is average received power of a wireless appliance belonging to each said cell.

23. The operation management apparatus according to claim 21, wherein said operational situation is an average SN (signal-to-noise) ratio of a wireless appliance belonging to each said cell.

24. The operation management apparatus according to claim 21, wherein said operational situation is an average interference amount of a wireless appliance belonging to each said cell.

25. The operation management apparatus according to claim 21, wherein said operational situation is an average SI (signal (desired wave)-to-interference wave) ratio of a wireless appliance belonging to each said cell.

26. The operation management apparatus according to claim 21, wherein said operational situation is a load status of a wireless appliance belonging to each said cell.

27. The operation management apparatus according to claim 21, wherein said operational situation is a throughput of a wireless appliance belonging to each said cell.

28. The operation management apparatus according to claim 21, wherein said operational situation is a wireless channel usage of a wireless appliance belonging to each said cell.

29. The operation management apparatus according to claim 21, wherein said operational situation is at least two of average received power, an average SN (signal-to-noise) ratio, an average interference amount, an average SI (signal (desired wave)-to-interference wave) ratio, a load status, a throughput, and a wireless channel usage of a wireless appliance belonging to each said cell.

30. A computer readable medium storing a program for causing a computer to execute an operation of an operation management apparatus in a radio communication system including a plurality of wireless base stations, said program including a process of obtaining an operational situation said cell by said cell, based upon operational information in cells corresponding to each of said plurality of said wireless base stations, each of said cells being defined by boundaries being smaller or equal to a coverage range of respective wireless base station, the boundary of a cell being determined by: collecting power transmitted, and antenna gain, from each wireless base station, computing a propagation loss from each of the wireless base stations at an arbitrary observation point, using a statistical technique employing an estimation model in which a radio wave damps depending upon distance or by use of a ray-tracing method, computing power received from each wireless base station at the observation point, deciding that the wireless base station that achieves maximum received power at the observation point is a connection base station at the observation point, and determining the space between points in which a connection base stations differ as cell boundaries, and a process of displaying for cells in a service area of the radio communication system by displaying said cell boundaries, and for displaying in each of said cells a uniform indication of the operational situation obtained by the operational situation obtaining process.

31. The operation management system according to claim 1, wherein said cell determining means includes a computer simulation means that simulates the boundary of the cell.

32. The operation management system according to claim 31, wherein the computer simulation means simulates the boundary of the cell based on power transmitted from each of the wireless base stations.

33. The operation management system according to claim 31, wherein said computer simulation means simulates the boundary of the cell using ray-tracing method.

34. The operation management system according to claim 1, wherein said cell determining means for determining a cell is a means of deciding a connection base station at any observation point in the cell based on a maximum received power.

* * * * *